March 7, 1950     J. L. KIMBALL     2,499,760
CONTROL SYSTEM
Filed April 29, 1947     3 Sheets-Sheet 1
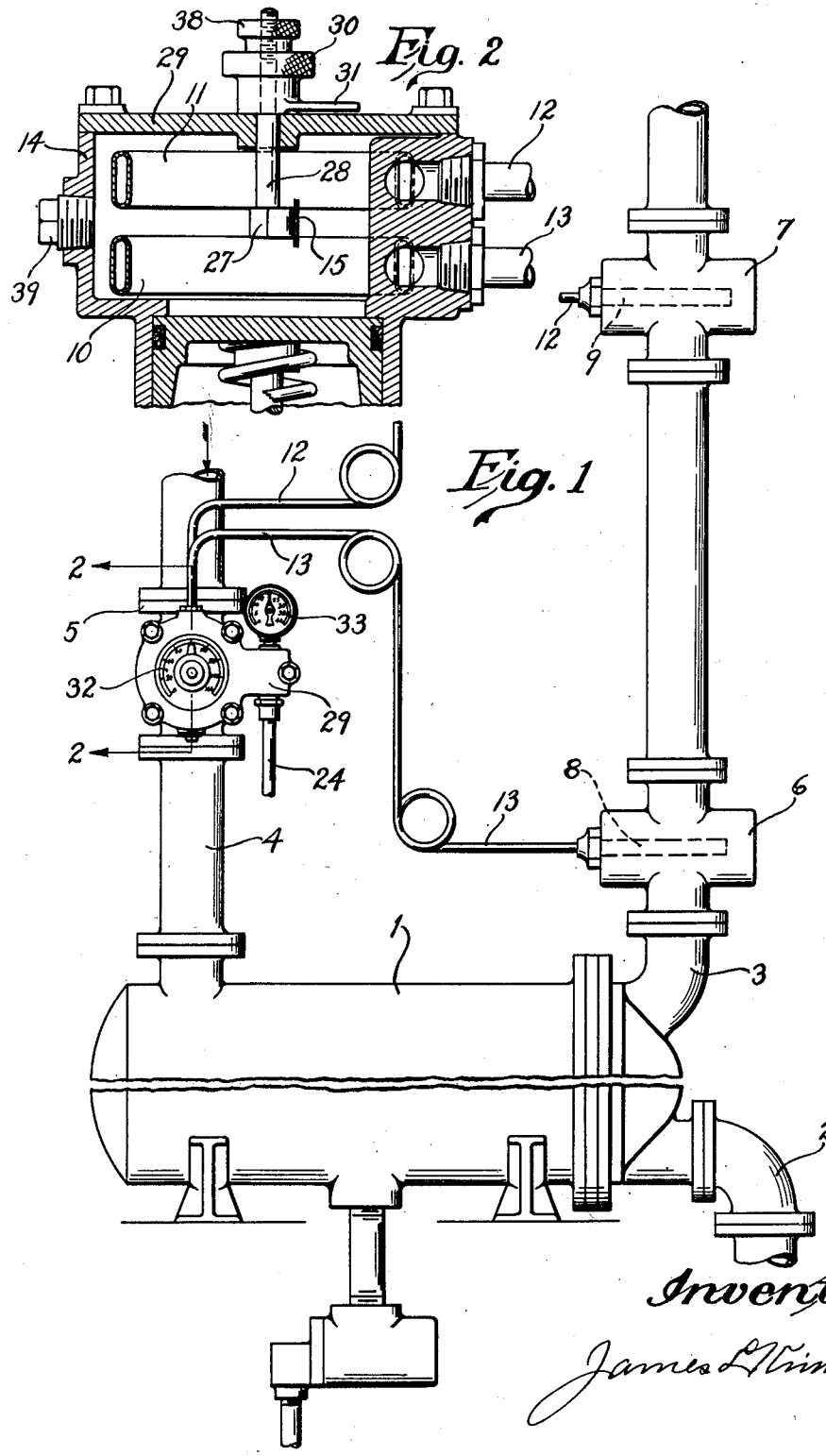
Inventor
James L. Kimball Inventor
James L Kimball March 7, 1950     J. L. KIMBALL     2,499,760
CONTROL SYSTEM
Filed April 29, 1947     3 Sheets-Sheet 3

Inventor
James L. Kimball

Patented Mar. 7, 1950

2,499,760

UNITED STATES PATENT OFFICE 2,499,760

CONTROL SYSTEM

James L. Kimball, Danvers, Mass., assignor to Ruggles-Klingemann Mfg. Co., Salem, Mass.

Application April 29, 1947, Serial No. 744,637

5 Claims. (Cl. 236—18)

My invention relates to a dual control system for balancing out objectionable wave oscillations as in hot water temperature control, as an example, the control of the temperature of hot water supplied from an instantaneous heater.

The reason why uniform temperature control is not possible when regulated as heretofore by a single thermostatic element, is due to the several response lags the most serious being the lag due to transportation between the temperature of the water within the heater and that effective at the thermostat located in the delivery conduit outside the heater.

The entire volume of water within the heater may pass through at less than the required temperature setting, but if so, then the next wave will pass through the heater at a temperature correspondingly above the required average. The over correction being due to the fact the thermostat has no control of the temperature in transit.

My invention is in registering these waves with two thermostats so spaced in the delivery conduit that they will transmit to the controller substantially the mean average temperature between the crest and the trough of the wave oscillation thus tending in the direction of an average heat input to the heater which will cause each succeeding wave to decrease and finally die out.

The above and other features of my invention will be understood from the detailed description and appended claims together with the drawings in which Fig. 1 shows the application of my invention to an instantaneous hot water heater.

Fig. 2 shows the control chamber taken on lines 2—2 of Fig. 1.

Figure 3:
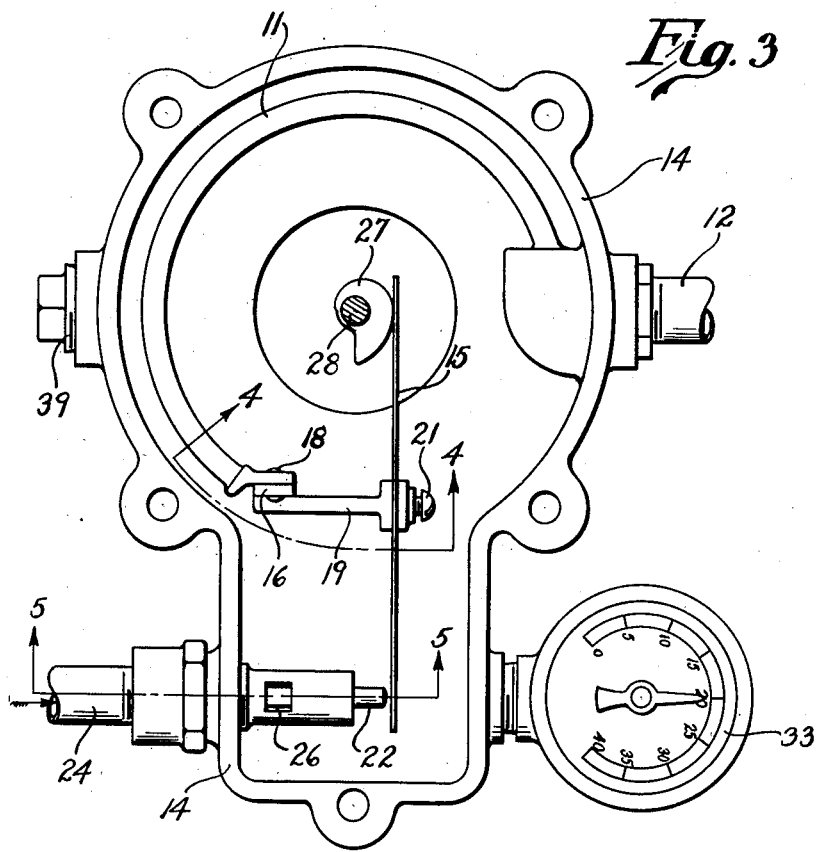
Fig. 3 shows a vertical elevation of the control chamber with cover removed.

Referring to Fig. 1, an instantaneous heater 1 has cold water inlet 2 and hot water outlet 3. A steam supply line 4 has thermostatically operated control 5 the control being from points 6 and 7 in the hot water delivery conduit. These thermostatic bulbs are each connected with separate Bourdon tubes 10 and 11 (see Fig. 2) by means of capillary tubes 12 and 13.

Figure 4:
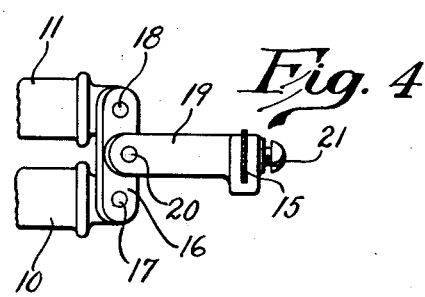
Fig. 4 shows the free ends of the Bourdon tube with the associated parts which operate the air control valve.

Referring now to Fig. 3, a pressuretight casing 14 is shown with cover removed exposing Bourdon tube 11 (tube 10 being directly back of tube 11). These two Bourdon tubes are connected at their free ends by means of a differential connection as shown in Fig. 4, to a flexible blade 15, the connecting parts including floating bar 16 having pivoted connections 17 and 18 with the free ends of the Bourdon tubes 10 and 11. At the center of this bar 16 a connecting link 19 is pivoted at 20 and has a clamping screw 21 for securing the same to blade 15.

Figure 5:
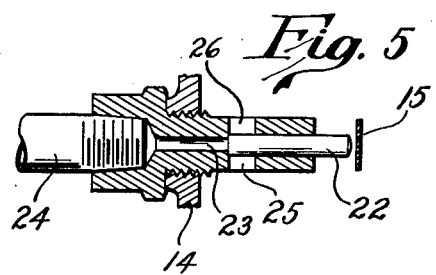
Fig. 5 shows a section of the air control valve taken on lines 5—5 of Fig. 3.
Figure 6:
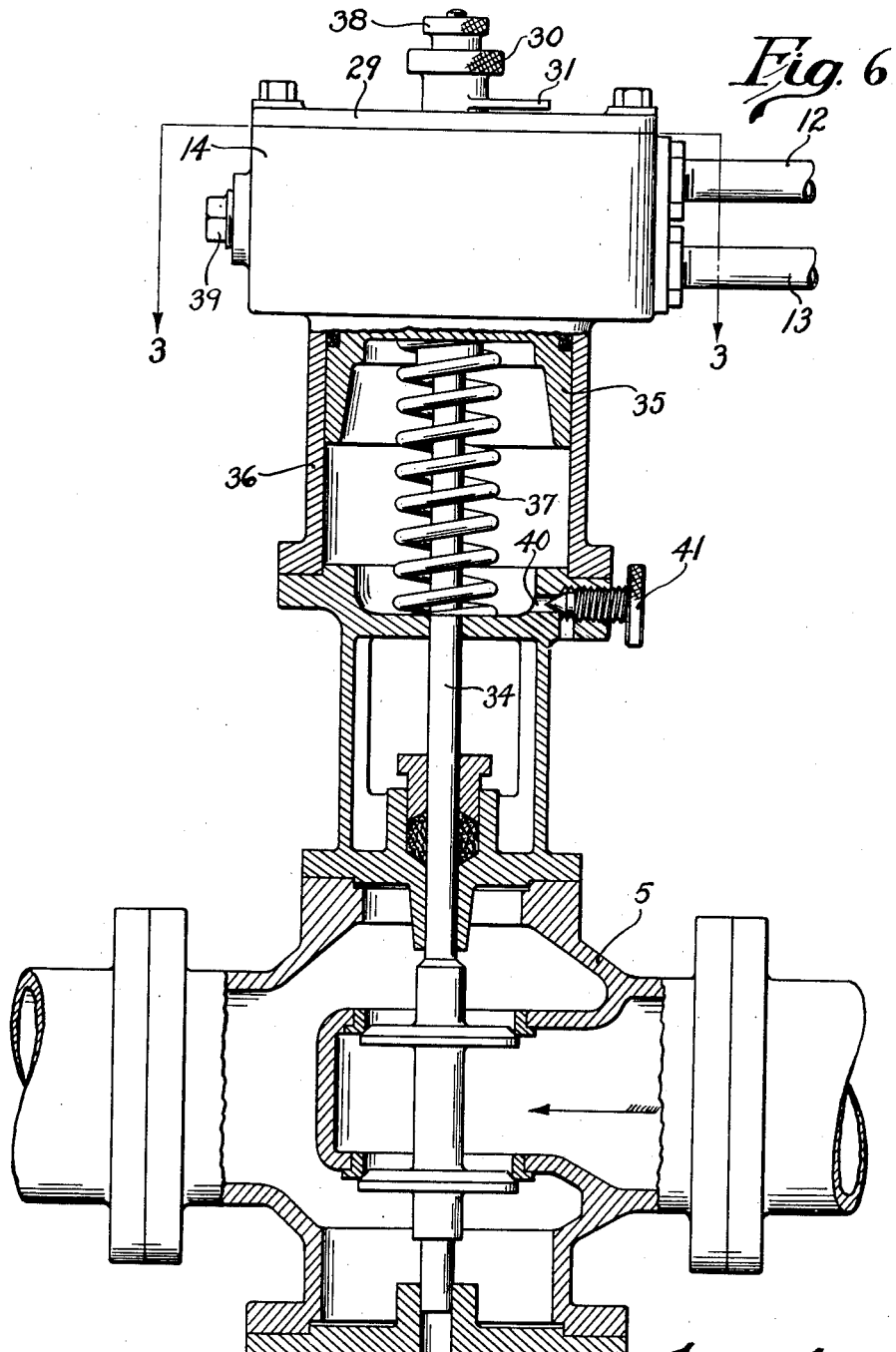
Fig. 6 shows a sectional view of the main valve which controls steam supply to the heater.

Referring now to Fig. 5, an air control valve 22 is operated from blade 15 and controls orifice 23 the inlet for air connection being at 24 and the discharge being through ports 25 and 26 to the casing 14. The opposite end of blade 15 is supported by a cam 27 the operating stem 28 of which extends through the cover 29 of casing 14 (see Fig. 2) and is provided with an adjustable knob 30 having pointers 31 which indicates on a dial 32 (see Fig. 1) the temperature setting of the control. A pressure gauge 33 indicates the variation in air pressure within the casing 14. Referring now to Fig. 6 a main valve 5 is of the conventional double disc inner valve construction having inlet as shown by the arrow. Stem 34 connects the double disc inner valve of valve 5 with an operating piston 35 located in cylinder 36. Cylinder 36 being integral with the casing 14 as shown in Fig. 2 and the piston 35 in communication with the air pressure within said casing, the exhaust flows past the actuating piston or pistons as the case may be.

Piston 35 is counteracted by a return spring 37 the arrangement being such that in case of the failure of air supply the main valve will be closed thus cutting off the steam supply to the heater. Knob 38 is for the purpose of making correction between the cam 27 and the pointer 31 in order that the dial reading will correspond with the true temperature as delivered beyond the two thermostatic bulbs 8 and 9.

In a relay operation, as above described, the main object is in obtaining control over as small a variation as possible. It is conceivable that stable operation could be so wide as to answer no purpose as a desired control of temperature. Therefore one of the objects of my invention is to avoid operation over an excessive rising and falling scale of temperature range. The other object is to accomplish this result without a sustained oscillation due to transfer and transportation lags. The first object is obtained by veering the air actuating pressure on the outside of the Bourdon tubes. The second object is accomplished by means of the two thermostatic controls which average out any tendency toward wave oscillation.

The arrangement as above described means that on an increase in the average temperature as registered at the two thermostatic bulbs 8 and 9 the Bourdon tubes 10 and 11 will be expanded and the air pressure within the casing 14, and effective on the actuating piston, will be less due to the closing of air valve 22. The mode of operation being such that the main steam valve reduces steam supply in accordance with the reduction of air pressure within the casing 14. Now this mode of operation means that as the pressure within the Bourdon tubes increases due to the higher average temperature the air pressure within the casing 14, acting on the outside of the Bourdon tubes decreases, the sum total of the increase and decrease effecting a tube operation of high sensitivity, or, in other words, a narrow band of operation and close control of the final temperature within the delivery conduit.

It is conceivable that with a single thermostatic element in the delivery conduit that the range or band operation would be so narrow as to cause sustained hunting action due to the heat transportation and transfer lags, but with the two thermostats properly spaced in the delivery conduit the tendency to wave oscillation would be broken down thus permitting a closer control of the final temperature than would otherwise be possible.

The volume of water between the two thermostats should be substantially equal to that within the heater tubes up to the location of the first thermostat, which should be located as close to the heater as possible.

In the operation of my invention we will assume the required steam valve setting is to maintain a water temperature of 160° F. and we will assume further that the capacity of the heater and the steam supply is such that the temperature of the water has been raised from 50° F. to 160° F. at the mid position of the heater tubes. Now from this point on to the first thermostat located outside the heater the rise in temperature will be relatively slower due to the fact the difference in temperature between the steam and the water within the tubes is increasingly less. Now theoretically the temperature at the first thermostat is approximately 190° F. which must pass the second thermostat at the same temperature causing the steam supply valve to be entirely closed, consequently a lower temperature comes in contact with the first thermostat the average between the two being more nearly the required steam valve setting. As each succeeding wave passes the thermostats they tend to become more nearly of the same temperature up to the point where there is a change in hot water demand.

Even though the mean average temperature effective at the thermostats is not a true average of the required steam valve setting, due to variation in load demand, or some variation in the thermostat spacing in relation to the volume of water in the heater, yet the over-correction will always be less than with a single thermostat and the tendency will always be to make each succeeding wave oscillation less up to the point of a further change in load demand.

The magnitude of these wave oscillations are greatest at low load demand but tend to level out as the load increases up to the point where the capacity of the heater is insufficient to meet the demand at the required temperature. Consequently, my invention is most helpful in smoothing out oscillations at low load demand especially if the low loads are of a fluctuating nature. It is general practice to install heaters of a capacity larger than present services require on the theory the demand for hot water may later increase. It is on such installations that my invention is most useful.

It will be seen by those skilled in the art to which my invention belongs that I have devised novel and useful means for stabilizing regulators of the class described at narrow band or range operation in which objectionable wave oscillations tend to be eliminated. However, I desire to have it understood that the apparatus shown is capable of modification and that only such limitations should be imposed as are indicated in the appended claims.

I claim as my invention:

1. In a hot water control system comprising, in combination a heater having a cold water inlet and a hot water delivery conduit, a source of heat supply to said heater for heating said water, means for controlling said heat supply from the temperature in the hot water delivery conduit including a motive device for operating the heat control means, air auxiliary control device for controlling a source of power for operating the motive device, two thermostats selectively spaced in the delivery conduit and arranged to jointly operate said auxiliary control device in accordance with the average temperature registered at the said two thermostats, said spacing being substantially equal in hot water volume between the two thermostats to that within the heater.

2. In a hot water control system comprising, in combination, a heater having a cold water inlet and a hot water delivery conduit, a steam supply line to the heater, means for controlling the steam supply to the heater from the temperature in the hot water delivery conduit including two thermostats selectively spaced in the hot water delivery conduit, said spacing being substantially equal in hot water volume between the two thermostats to that within the heater and valve means jointly operated by the said thermostats for effecting an average setting of the steam supply means in accordance with the average temperature registered at the said two thermostats whereby the heat input to said heater shall correspond to the required delivery temperature.

3. In a hot water control system comprising, in combination, a heater having a cold water inlet and a hot water delivery conduit, a source of heat supply to said heater for heating said water, means for controlling said heat supply from the temperature in the hot water delivery conduit including two thermostats selectively spaced in the hot water delivery conduit, said spacing being substantially equal in hot water volume between the two thermostats to that within the heater, and means jointly operated by the said thermostats for regulating the heat supply in accordance with the average temperature registered at the said two thermostats, whereby the heat input to the heater shall correspond substantially to the required delivery temperature.

4. In a hot water control system comprising, in combination a heater having a cold water inlet and a hot water delivery conduit, a steam supply line to the heater, thermostatic means for controlling the steam supply to the heater including a main steam control valve, an auxiliary control valve for controlling a source of pressure and means operated thereby for controlling the operation of the steam control valve, two thermostats selectively spaced in the hot water delivery conduit adapted to jointly control the auxiliary control valve, said thermostats being so spaced in the delivery conduit that the volume of hot water between the two is substantially equal to the volume of water within the heater, the arrangement being such that the steam valve setting shall correspond to the average temperature effective at the said two thermostatic bulbs, whereby the heat input to said heater shall correspond substantially to the required delivery temperature.

5. In a hot water control system comprising, in combination, a heater having a cold water inlet and a hot water delivery conduit, a steam supply line to the heater, means for controlling the steam supply to the heater from the temperature in the hot water delivery conduit including a spring loaded motive device, a pressure chamber in communication with said device, thermostatic means including two Bourdon tubes within said chamber and valve control means jointly operated thereby for controlling air pressure supply to said chamber for actuating the said motive device, said Bourdon tubes having capillary tube connections outside said chamber connecting with thermostatic bulbs selectively spaced in the hot water delivery conduit, said spacing being substantially equal in hot water volume between the two bulbs to that within the heater, the arrangement being such that the air pressure within said casing is variably controlled in the reverse direction to that of the pressure variation within said Bourdon tubes.

JAMES L. KIMBALL.

REFERENCES CITED

The following references are of record in the file of this patent:

UNITED STATES PATENTS

| Number | Name | Date |
|---|---|---|
| 1,575,725 | Stewart | Mar. 9, 1926 |
| 2,170,402 | Faust | Aug. 22, 1939 |
| 2,185,671 | Kimball | Jan. 2, 1940 |
| 2,196,316 | Long | Apr. 9, 1940 |
| 2,200,318 | Yonkers | May 14, 1940 |
| 2,296,325 | Bak | Sept. 22, 1942 |